US009197646B2

(12) United States Patent
Farris

(10) Patent No.: US 9,197,646 B2
(45) Date of Patent: Nov. 24, 2015

(54) VERIFYING SOURCE OF EMAIL

(71) Applicant: Verizon Patent and Licensing Inc., Basking Ridge, NJ (US)

(72) Inventor: Jack M. Farris, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 58 days.

(21) Appl. No.: 13/916,151

(22) Filed: Jun. 12, 2013

(65) Prior Publication Data

US 2013/0333030 A1 Dec. 12, 2013

Related U.S. Application Data

(60) Provisional application No. 61/658,629, filed on Jun. 12, 2012.

(51) Int. Cl.
| | | |
|---|---|---|
| G06F 11/00 | (2006.01) | |
| G06F 15/16 | (2006.01) | |
| H04L 29/06 | (2006.01) | |
| H04L 12/58 | (2006.01) | |

(52) U.S. Cl.
CPC .............. *H04L 63/123* (2013.01); *H04L 51/12* (2013.01); *H04L 63/126* (2013.01); *H04L 63/1483* (2013.01); *H04L 51/08* (2013.01)

(58) Field of Classification Search
CPC .......................... H04L 63/123; H04L 63/1483
USPC ......... 726/22, 1, 23, 24, 25, 26; 709/209, 202
See application file for complete search history.

(56) References Cited

U.S. PATENT DOCUMENTS

| | | | | |
|---|---|---|---|---|
| 7,428,750 B1 * | 9/2008 | Dunn et al. | ......................... | 726/8 |
| 7,603,292 B1 * | 10/2009 | Bragg et al. | ................ | 705/26.35 |
| 7,970,677 B1 * | 6/2011 | Oakes et al. | ..................... | 705/35 |
| 8,229,782 B1 * | 7/2012 | Adams et al. | ................. | 705/7.32 |
| 8,612,397 B2 * | 12/2013 | Henderson | ..................... | 707/687 |
| 2004/0054741 A1 * | 3/2004 | Weatherby et al. | ............ | 709/206 |
| 2006/0053202 A1 * | 3/2006 | Foo et al. | ........................ | 709/206 |
| 2007/0136430 A1 * | 6/2007 | Qureshi et al. | ................. | 709/206 |
| 2008/0021741 A1 * | 1/2008 | Holla et al. | ......................... | 705/3 |
| 2008/0021834 A1 * | 1/2008 | Holla et al. | ....................... | 705/51 |
| 2008/0178081 A1 * | 7/2008 | Reshef et al. | .................. | 715/700 |
| 2008/0187140 A1 * | 8/2008 | McGillian et al. | ............ | 380/278 |
| 2009/0031033 A1 * | 1/2009 | Deng et al. | ..................... | 709/229 |
| 2009/0112882 A1 * | 4/2009 | Maresh et al. | ................... | 707/10 |
| 2009/0138711 A1 * | 5/2009 | Heimbigner | .................. | 713/170 |
| 2010/0043071 A1 * | 2/2010 | Wang | ............................... | 726/22 |
| 2012/0066498 A1 * | 3/2012 | Engert | ........................... | 713/170 |
| 2012/0084366 A1 * | 4/2012 | Killoran et al. | ................ | 709/206 |
| 2012/0167174 A1 * | 6/2012 | Saxena et al. | ....................... | 726/3 |
| 2012/0254332 A1 * | 10/2012 | Irvin | .................................. | 709/206 |
| 2012/0310753 A1 * | 12/2012 | Gaddis | ......................... | 705/14.73 |
| 2012/0311669 A1 * | 12/2012 | Akase | .................................. | 726/3 |
| 2013/0024788 A1 * | 1/2013 | Olsen et al. | ..................... | 715/753 |
| 2013/0054467 A1 * | 2/2013 | Dala et al. | ......................... | 705/51 |
| 2013/0080242 A1 * | 3/2013 | Alhadeff et al. | ............ | 705/14.39 |
| 2013/0103575 A1 * | 4/2013 | Bhatia | ............................. | 705/39 |
| 2013/0103944 A1 * | 4/2013 | Adams et al. | .................. | 713/168 |
| 2013/0191402 A1 * | 7/2013 | Wilkins et al. | ................ | 707/752 |

(Continued)

*Primary Examiner* — Abu Sholeman

(57) ABSTRACT

A system is configured to generate an email with a main hyperlink and a verification hyperlink; transmit the email to an email account of a user; receive an indication of a selection of the verification hyperlink; and transmit a confirmation message to a recipient device of the user when the verification hyperlink is selected.

25 Claims, 5 Drawing Sheets

(56) References Cited

U.S. PATENT DOCUMENTS

2013/0339141 A1* 12/2013 Stibel et al. ............... 705/14.49
2014/0013426 A1* 1/2014 Douceur et al. ............... 726/22
2014/0089156 A1* 3/2014 Williams et al. ............... 705/35
2014/0156770 A1* 6/2014 Zheng ........................... 709/206

* cited by examiner

VERIFYING SOURCE OF EMAIL

RELATED APPLICATIONS

This application claims priority, under 35 U.S.C. §119, to U.S. Provisional Patent Application Ser. No. 61/658,629, filed Jun. 12, 2012, the disclosure of which is incorporated herein by reference.

BACKGROUND

A recent method of malicious action involving interconnected computing systems (e.g., over the Internet) involves impersonation of legitimate network sites of trusted entities—such as financial institutions or other commercial entities—in order to trick a user into disclosing personal information that can be used to commit identity theft or other forms of fraud. This conduct—commonly referred to as "phishing"—typically involves sending out emails that include a hyperlink to a fake website that appears like a legitimate website of an entity with which the recipient may have a relationship (e.g., a customer of the entity). The fake website can then prompt the user to provide confidential information of the user that can later be used to commit fraud. Phishing schemes have become sophisticated, such that the user is often unable to verify that a source of the email is the actual entity identified by the email, before selecting the hyperlink that directs the user to the fake website.

DETAILED DESCRIPTION OF PREFERRED EMBODIMENTS

Figure 1:
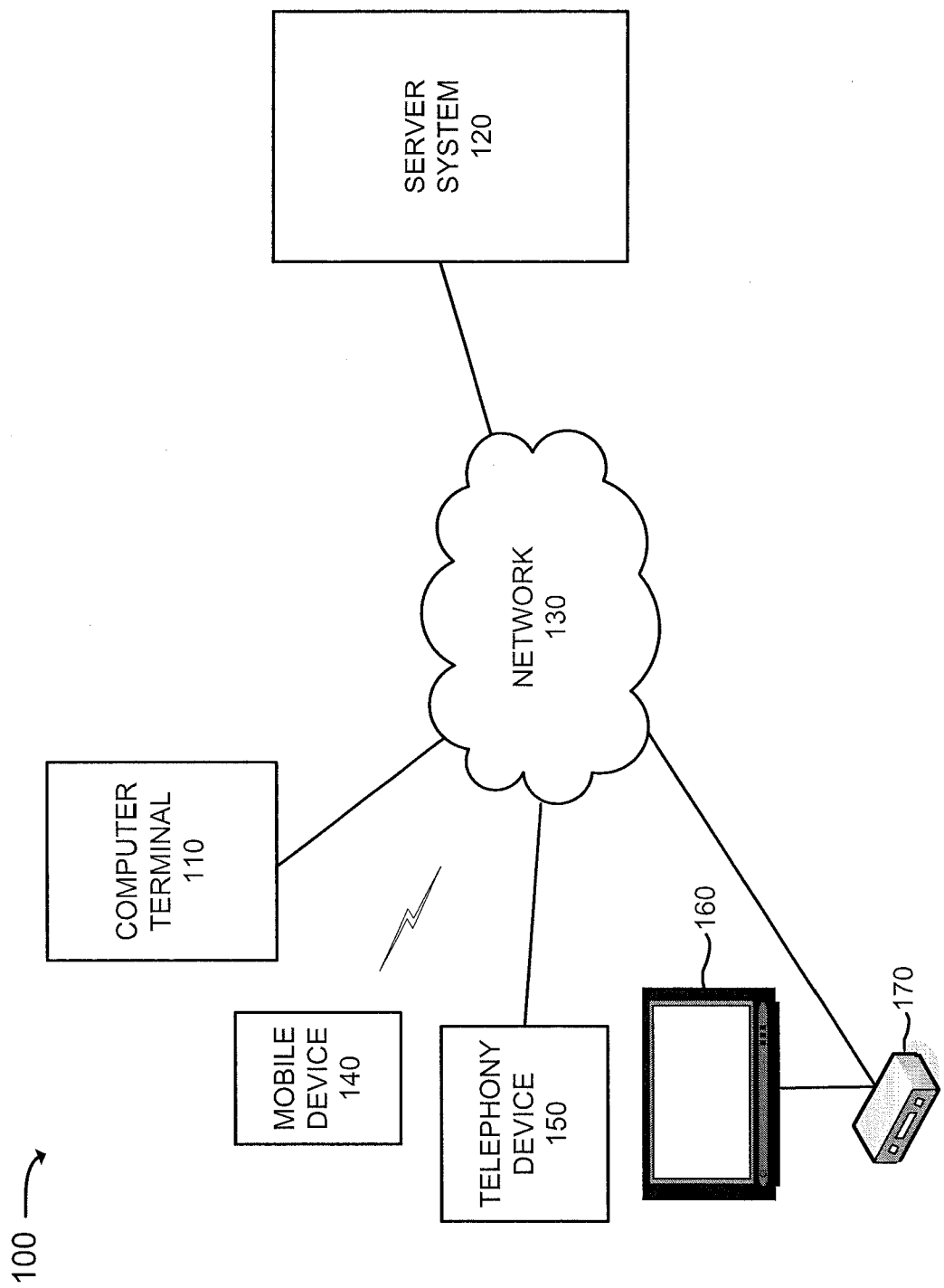
FIG. 1 is a diagram of an example environment in which systems and/or methods described herein may be implemented.

The following detailed description refers to the accompanying drawings. The same reference numbers in different drawings may identify the same or similar elements.

An implementation, described herein, may allow a user to verify that a source of an email is a legitimate entity identified by the email. For example, a user may receive an email identified as originating from a particular entity. The email may include a main hyperlink to a site associated with the particular entity and a verification hyperlink. The user may select the verification hyperlink to verify that the email is from the particular entity, and not from a phisher posing as the particular entity. In response to the selection of the verification hyperlink, a confirmation message may be transmitted to a device (e.g., a mobile phone, a television, a computer, etc.) associated with the user. The user may verify that the email is from the particular entity based on the confirmation message. Thereafter, the user may select the main hyperlink to access (e.g., navigate to) a target webpage of a website associated with the particular entity with some confidence that the target webpage is actually associated with the entity.

In another implementation, a user may receive an email identified as originating from a particular entity. The email may include a code and instructions for using the code to access a site associated with the particular entity. The code may include a plurality of characters (e.g., letters, numbers, symbols, etc.). The user may use a web browser to enter a Uniform Resource Identifier (URI) that is an address of a website associated with the particular entity. Thereafter, the user may enter the code via the website. A device associated with the particular entity may navigate/provide content from the site based on the code.

In another implementation, a user may receive an email identified as originating from a particular entity. The email may include a main hyperlink to a site associated with the particular entity and an instruction to send a verification email, for example as a reply to the original email. The user may send the verification email directed back to the originating email source (or another location as may be specified by the original email). In response to the receipt of the verification email, a confirmation message may be transmitted to a device (e.g., a mobile phone, a television, a computer, etc.) associated with the user. The user may verify that the original email is from the particular entity based on the confirmation message. Thereafter, the user may select the main hyperlink to access (e.g., navigate to) a target webpage of a website associated with the particular entity with some confidence that the target webpage is actually associated with the entity.

As used herein, "email" refers to the various technologies that are used to facilitate visual communications over networks. A common example is the Simple Mail Transfer Protocol (SMTP), such as described in Internet Engineering Task Force RFC5321 and RFC5322. Other types of email for purposes of the present invention can include SMS messaging, instant messaging and private messaging system that may be implemented by specific applications or service providers (e.g., FACEBOOK).

FIG. 1 is a diagram of an example environment 100 in which systems and/or methods described herein may be implemented. As shown in FIG. 1, environment 100 may include one or more of the following components: server system 120, a network 130, and user devices such as a computer terminal 110, a mobile device 140, a telephony device 150, a video display device 160, and a network-specific device 170. In practice, environment 100 may include additional components, fewer components, different components, or differently arranged components than are shown in FIG. 1.

In some implementations, one or more of the components of environment 100 may perform one or more functions described as being performed by another one or more of the components of environment 100. For example, computer terminal 110, mobile device 140, and/or telephony device 150 could be integrated into a single device that performs all or some of the functions described below as being performed by an individual one of these devices.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Computer terminal 110 may include any computation or communication device, such as a communication device that is capable of communicating with server system 120 via network 130. In one implementation, computer terminal 110 may take the form of any computer device, including a web service terminal, a personal computer, a laptop computer, a handheld computer, a smart phone, a mobile telephone device, a personal media player, etc. In another implementation, mobile device 140, telephony device 150, and/or network-specific device 170 may represent and act as computer terminal 110. A user, of mobile device 140, telephony device 150, and/or network-specific device 170, may operate computer terminal 110. In one example, computer terminal 110 may allow the user to access an email account of (e.g., receive email sent to) the user. Computer terminal 110 may also allow the user to access one or more web services (e.g., a verification registration service, a website of a particular entity, etc.) provided by web server 120.

Server system 120 may include any computation or communication device, such as a communication device that is capable of communicating, via network 130, with computer terminal 110, mobile device 140, telephony device 150, and/or network-specific device 170. Server system 120 may represent a single server device or a collection of multiple server devices and/or computer systems. For example, server system 120 may include one or more web (HTTP) servers, email servers and/or databases. Server system 120 may be configured to provide a verification registration of a user of computer terminal 110. Server system 120 may further be configured to generate and transmit emails to an email account of the user. In one implementation, server system 120 may also be configured to cause confirmation messages to be transmitted to one or more of mobile device 140, telephony device 150, and/or network-specific device 170, of the user, in order to verify that an email is from a legitimate entity identified in the email. In another implementation, server system 120 may also be configured to navigate the user to a target web page of a site associated with the legitimate entity based on information (e.g., a code) included in an email sent to the user from the legitimate entity. The legitimate entity may own, operate, and/or use services of server system 120.

Network 130 may include one or more wired and/or wireless networks. For example, network 130 may include a cellular network, a public land mobile network (PLMN), a second generation (2G) network, a third generation (3G) network, a fourth generation (4G) network, a fifth generation (5G) network, and/or another network. Additionally, or alternatively, network 130 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network (e.g., the VERIZON FIOS network), and/or a combination of these or other types of networks. These networks may be "open" in that users may communicate over the network using any devices or software that comply with the protocols of the network, or may be "closed" in that only network-specific devices and/or software can be used to communicate over the network.

Mobile device 140 may include any mobile computation or communication device, such as a communication device that is capable of receiving text messages (e.g., messages sent using the Short Message Service (SMS) or Multimedia Messaging service (MMS)) via network 130. In one implementation, mobile device 140 may take the form of a mobile telephone device, a smart phone, a personal digital assistant (PDA), a personal media player, etc. Mobile device 140 may receive a confirmation message, in the form of a text message, after a user associated with mobile device 140 selects a verification hyperlink in an email received by the user. The text message may include text, image, video, and/or audio content. A mobile telephone number (MTN) associated with mobile device 140 and/or the user may be used to transmit the text message to mobile device 140. The user may own, operate, and/or use services of mobile device 140.

Telephony device 150 may include any computation or communication device, such as a communication device that is capable of receiving voice response unit (VRU) messages via network 130. In one implementation, telephony device 150 may take the form of a landline telephone device, a cordless telephone device, a mobile telephone device, a smart phone, a PDA, a personal media player, etc. Telephony device 150 may receive a confirmation message, in the form of a VRU message, after a user associated with telephony device 150 selects a verification hyperlink in an email received by the user (or sends a verification email in response to the email). The VRU message may include prerecorded or dynamically generated audio content. A billing telephone number (BTN) associated with the user, and/or a working telephone number (WTN) associated with the BTN, may be used to transmit the VRU message to user device 150. The user may own, operate, and/or use services of telephony device 150.

Video display device 160 may include any device capable of receiving and/or reproducing video and/or audio signals (e.g., any device capable of displaying television content). In one implementation, video display device 160 may take the form of a television. In another implementation, video display device 160 may include a computer monitor, a display of a communication device (e.g., a telephone, such as a VoIP telephone or a mobile telephone, or a PDA), or the like. Video display device 160 may be connected to network-specific device 170 and may receive signals, from network-specific device 170, containing content for display.

Network-specific device 170 may include any device capable of receiving and processing data (e.g., a confirmation message, television content, a TV guide, etc.) received over a closed network of network 130 and presenting the confirmation message, based on the data, on a video display device 160. In one implementation, network-specific device 170 may take the form of a set-top box (STB) connected to a video service network (e.g., a cable television network). In another implementation, network-specific device 170 may include a computer device, a cable card, a communication device (e.g., a telephone, such as a voice over Internet protocol (VoIP) telephone or a mobile telephone, or a PDA), or the like.

Network-specific device 170 may receive data after a user associated with network-specific device 170 selects a verification hyperlink in an email received by the user (or sends a verification email in response to the email). Network-specific device 170 may perform decoding and/or decryption functions on the data to extract a confirmation message from the data. Network-specific device 170 may present the confirmation message on video display device 160. Video display device 160 and network-specific device 170 may be part of a single device.

Figure 2:
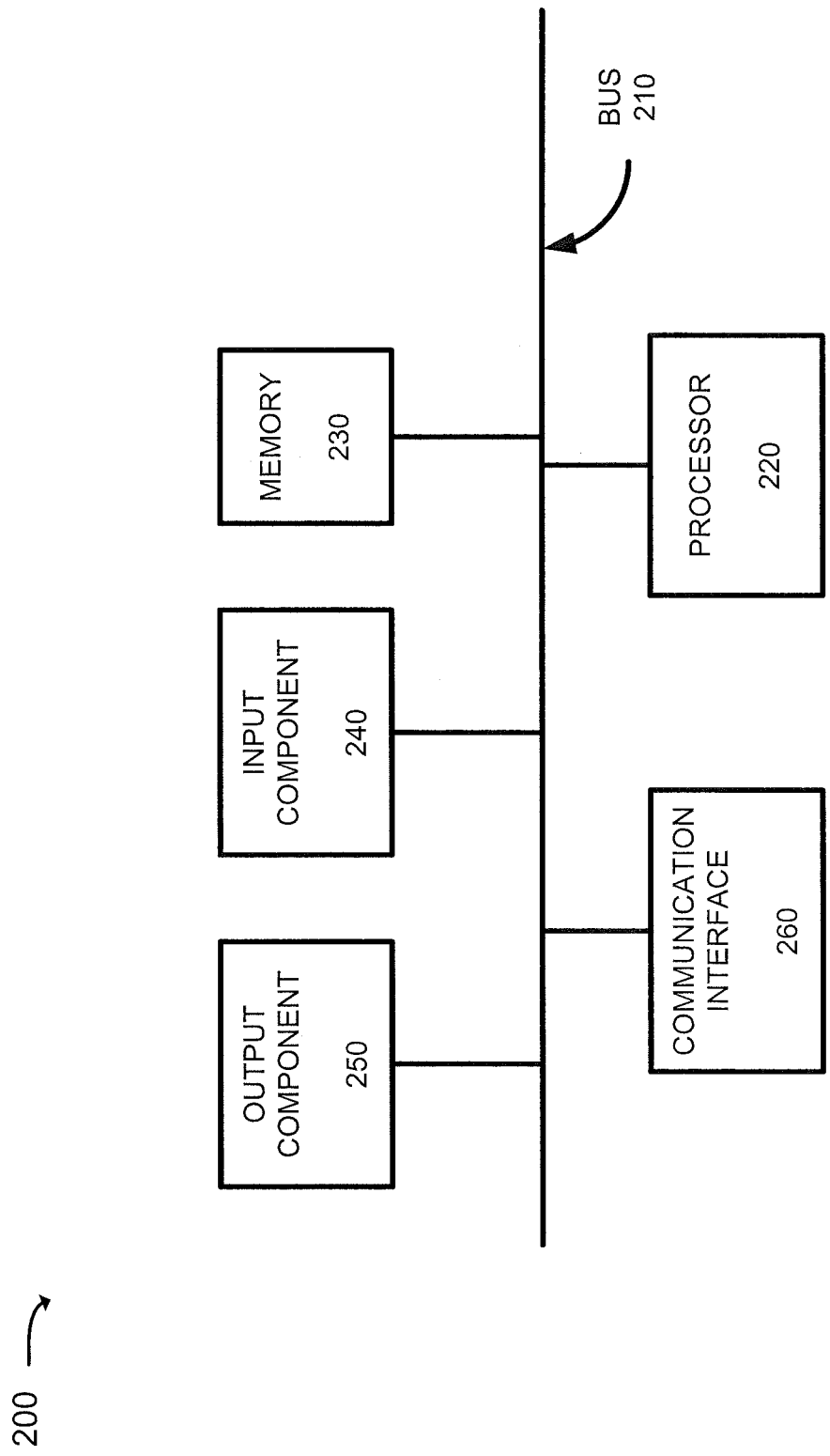
FIG. 2 is a diagram of example components of one or more of the devices of FIG. 1.

FIG. 2 is a diagram of example components of device 200 that may correspond to computer terminal 110, server system 120, mobile device 140, telephony device 150, and/or network-specific device 170. Each one of computer terminal 110, server system 120, mobile device 140, telephony device 150, and/or network-specific device 170 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information and instructions for execution by processor 220.

Input component 240 may include one or more input mechanisms that permit a user to input information to device 200. Output component 250 may include one or more output mechanisms that output information to the user. Examples of input and output mechanisms may include buttons, a touch screen interface to permit data and control commands to be input into device 200, a speaker to receive electrical signals and output audio signals, a microphone to receive audio signals and output electrical signals, a display to output visual information (e.g., images, video, text), etc.

Communication interface 260 may include any transceiver-like mechanism that enables device 200 to communicate with other devices and/or systems, for example, over network 130. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
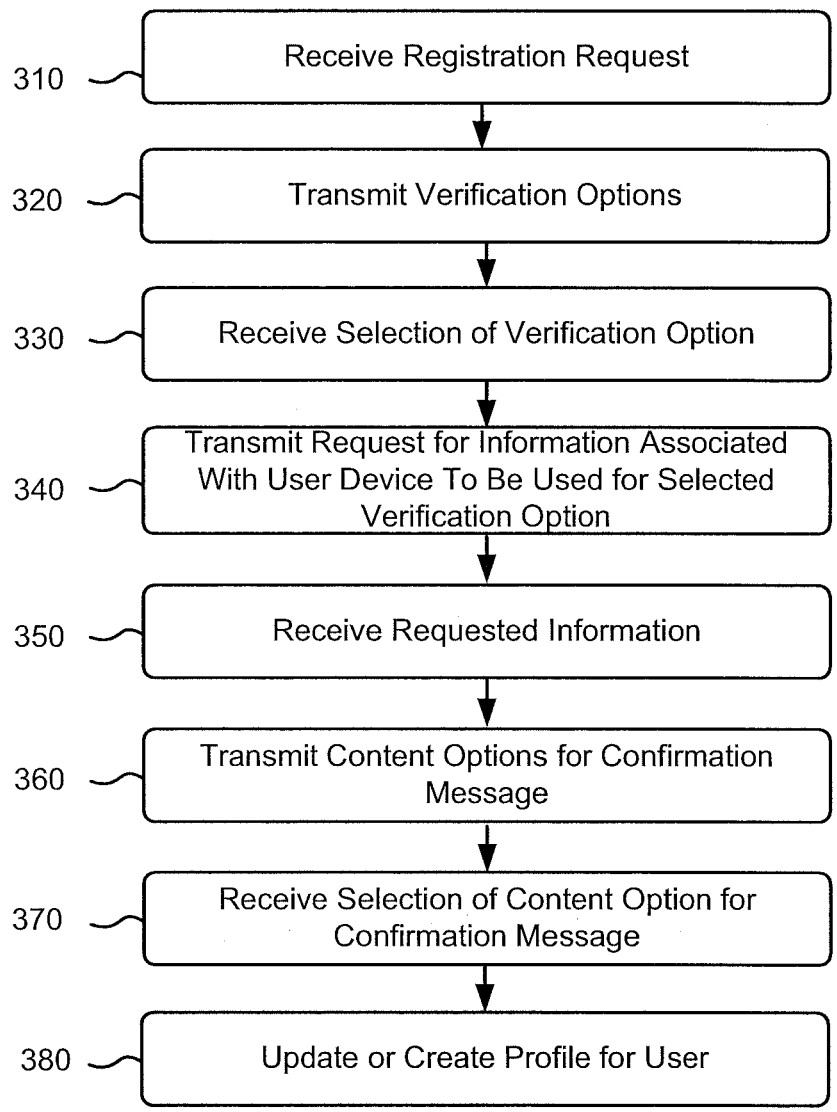
FIG. 3 is a flowchart of an example process for registering a user for a verification service.

FIG. 3 is a flowchart of an example process 300 for registering a user for a verification service. In one implementation, server system 120 may perform process 300. In another implementation, a device or collection of devices separate from, or in combination with, server system 120 may perform some or all of process 300.

As show in FIG. 3, process 300 may include receiving a registration request (block 310). In one implementation, a user may decide to register for a verification service in order to receive verification that an email is from a source (e.g., a legitimate source identified in and/or associated with the email). The verification service may allow the user to avoid phishing emails that link to a fake website that appears like a legitimate website of the source. To register for the verification service, the user may use computer terminal 110, and/or another computing device (e.g., mobile device 140) to access a registration webpage provided by server system 120. In another implementation, the user may be redirected to the registration webpage while accessing a legitimate website associated with the source. For example, the user may access the legitimate website while accessing a user account (e.g., an online banking account) associated with the source or purchasing a service (e.g., mobile telephone service) from the source, and as part of the account access the user may be directed to a registration web page for the verification service.

Thereafter, in one implementation, the registration webpage may prompt the user to enter user information (e.g., a username, a phone number associated (e.g., a MTN and/or a BTN) with an account of the user, a password, etc.). After entering the user information, the user may select a button on the registration webpage to register for the verification service. Server system 120 may receive the entered user information as part of a registration request for the user. Server system 120 may authenticate the user based on the user information. In another implementation, the user may already have been authenticated by server system 120 when the user accesses the registration web page (for example, in the case of redirection).

Process 300 may further include transmitting verification options (block 320) and receiving a selection of a verification option (block 330). For example, server system 120 may retrieve verification options that are available to the user for the verification service. Each one of the verification options may allow the user to verify, in the future, that an email is from the source associated with server system 120 and is not a phishing email. The verification options may include one or more of: (1) transmitting a text message, as a confirmation message, to mobile device 140 of the user when the user selects a verification hyperlink in the email; (2) transmitting a VRU message, as the confirmation message, to telephony device 150 of the user when the user selects the verification hyperlink in the email; (3) transmitting data to network-specific device 170 of the user, in order to present the confirmation message on video display device 160, when the user selects the verification hyperlink in the email; (4) the user using a code that is included in the email to access a target webpage, of the legitimate website, associated with the code; etc. Server system 120 may present (or enable for selection) only those options that are available to the user, for example, based on whether the user has provided the information for such options.

Server system 120 may transmit the verification options to computer terminal 110. In one implementation, the user may use computer terminal 110 to select one of the verification options. Computer terminal 110 may transmit the selection of one of the verification options to server system 120. Server system 120 may receive the selection of one of the verification options. In some implementations, the user may select one or more of the verification options and/or specify the conditions for which each one of the selected verification options should be used by server system 120. For example, verification options can be specified based on a time of day when the email is sent, a time of day when the verification is requested, a type of the email (e.g., requires immediate response, service notification, fraud warning, etc.), and so forth.

Process 300 may further include transmitting a request for information associated with a user device to be used for the selected verification option (block 340) and receiving the requested information (block 350). For example, the server system 120 may determine which information is necessary to provide the verification service, to the user, based on the verification option selected by the user. In one example, when the user selects the option for mobile device 140 to receive a text message as the confirmation message, the request may include a request for a MTN and/or other account information associated with mobile device 140. In another example, when the user selects the option for telephony device 150 to receive a VRU message, as the confirmation message, the request may include a request for a BTN, a WTN, and/or account information associated with telephony device 150. In yet another example, when the user selects the option to present the confirmation message on video display device 160 via network-specific device 170, the request may include an address of a residence associated with the user and/or network-specific device 170, account information associated with network-specific device 170, and/or other information that identifies network-specific device 170. In some implementations, this information is already stored by server system 120, in which case this step can be omitted.

Server system 120 may transmit the request for information associated with a recipient device (e.g., mobile device 140, telephony device 150, network-specific device 170, etc.) to computer terminal 110. The user may use computer terminal 110 to enter the requested information. Computer terminal 110 may transmit the requested information to server system 120. Server system 120 may receive the requested information. In another implementation, server system 120 may also request, retrieve, and/or receive client device information for computer terminal 110 and/or for any other computer devices (e.g., mobile device 140) that the user wants to use to prompt the verification service. The client device information may uniquely identify computer terminal 110 and/or the other computer devices. Server system 120 may perform the verification service only when the user uses computer terminal 110 and/or the other computer devices, identified by the client device information, to send the verification request and/or to enter the code.

Process 300 may also include transmitting content options for the confirmation message (block 360) and receiving a selection of a content option for the confirmation message (block 370). For example, server system 120 may retrieve content options that are available for the selected verification option based on the selected verification option and or information associated with the applicable device (e.g., a type of the device, whether mobile device 140 handles MMS messages or only SMS messages, etc.). Each one of the content options may specify content which is to be included in the confirmation message. The content may provide an extra level of assurance to the user that the email is from the source and not from a phisher when the user is able to recognize the content that is included in the confirmation message.

The content options may include one or more of a word provided or selected by the user (e.g., from a list of one or more confirmation words); recorded or dynamically generated audio content that includes the word; audio content provided (e.g., recorded) or selected by the user; image content provided or selected by the user; video content provided or selected by the user; etc.

Server system 120 may transmit the content options to computer terminal 110. The user may use computer terminal 110 to select one of the content options and/or to select or provide the content for the selected content option. Computer terminal 110 may transmit the selected content option and the content to server system 120. Server system 120 may receive the selected content option and the content.

Process 300 may include updating or creating a profile for the user (block 380). For example, server system 120 may store or have access to a profile for the user. Server system 120 may update the profile to register the user for the verification service. If the profile for the user does not exist, server system 120 may create the profile. Updating or creating the profile may include storing information about the verification option(s) selected by the user, the information associated with the applicable device(s) to be used for the verification service, the content option selected by the user, the content to be included in the confirmation message, and/or the client device information associated with the computer device (e.g., computer terminal 110) that the user may use to trigger the verification service (e.g., by selecting the verification hyperlink). Server system 120 may use the stored information to verify that future emails sent to the user are from the source identified in the email (and are not phishing emails), as described further below.

Figure 4:
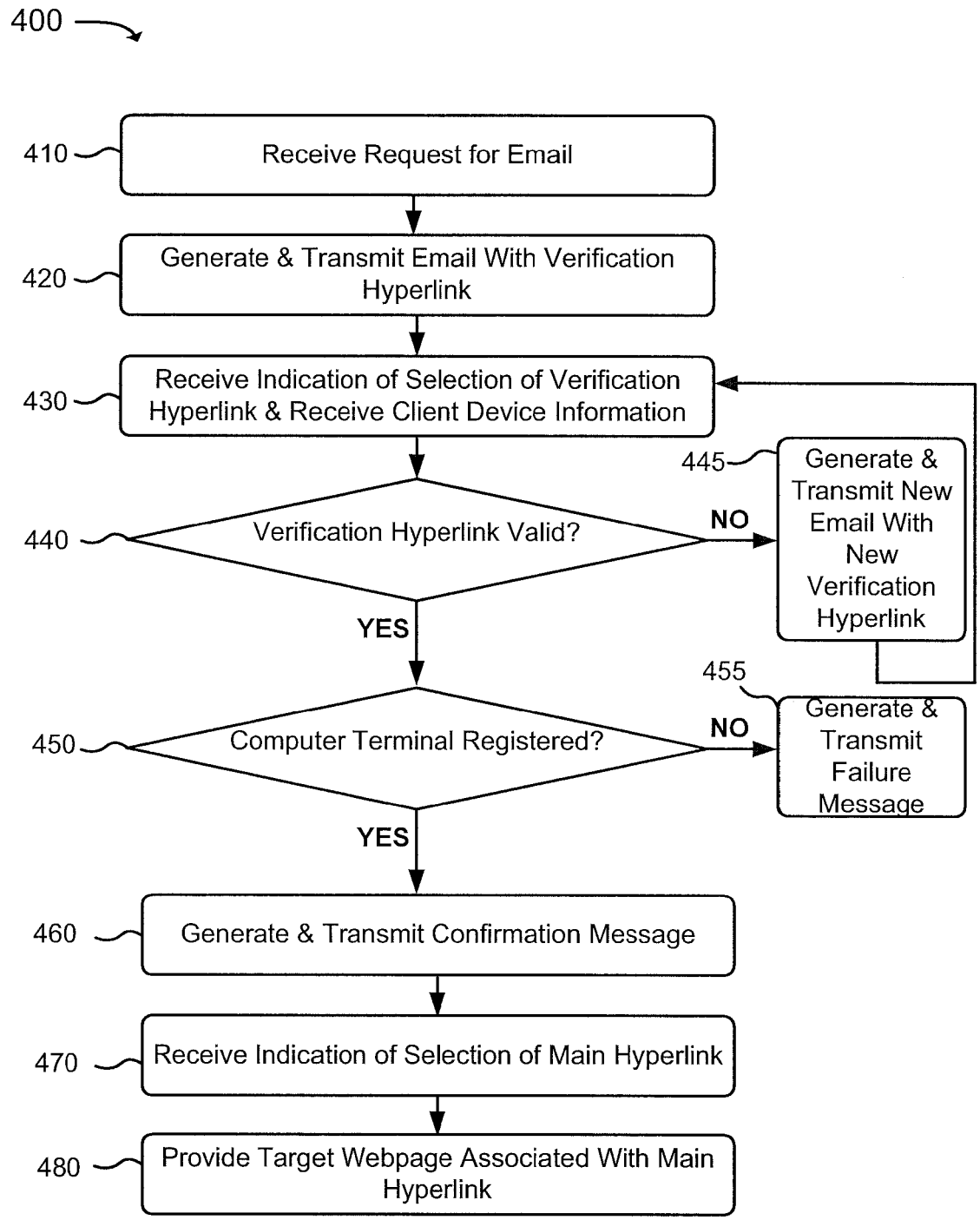
FIG. 4 is a flowchart of an example process for verifying a source of an email.

FIG. 4 is a flowchart of an example process 400 for verifying a source of an email. In one implementation, server system 120 may perform process 400. In another implementation, a device or collection of devices separate from, or in combination with, server system 120 may perform some or all of process 400.

As shown in FIG. 4, process 400 may include receiving a request for transmission of an email (block 410). For example, an entity (e.g., a marketing department or a billing department of a business) may decide to transmit an email to a user that will include a main hyperlink to a target webpage of a website associated with the user. Server system 120 may receive, from a device associated with the entity, a request for the email. The request may include the main hyperlink, other information to include in the email, an email address of the user, and/or other identifying information (e.g., username, unique identifier, account number, etc.) associated with the user.

Process 400 may further include generating and transmitting the email to the user with a verification hyperlink (block 420). For example, server system 120 may generate the email based on the information in the request. When generating the email, server system 120 may include the main hyperlink and a verification hyperlink in the email. The verification hyperlink may specify a fully-qualified domain name associated with the server system 120, or an actual deliverable address associated with server system 120 (e.g., an IP address) which does not require further resolution. The verification hyperlink may include a unique identifier. Server system 120 may include and/or have access to a database that specifies a relationship between the unique identifier and the user and/or the specific email being sent. Server system 120 may transmit the email to an email account of the user.

Process 400 may also include receiving an indication of selection of the verification hyperlink and receiving client device information (block 430). For example, the user may use computer terminal 110 to access the email account of the user. The email may prompt the user to select the main hyperlink to access the target webpage. The user may, first, select the verification hyperlink, in the email, to verify that the source of the email is the entity (identified in the email) and not a phisher. Thereafter, server system 120 may receive an indication of the selection of the verification hyperlink. In some implementations, when the user selects the verification hyperlink by using computer terminal 110, server system 120 may also receive client device information associated with computer terminal 110. For example, computer terminal 110 may generate an HTTP message directed to the verification hyperlink and including client device information.

Process 400 may also include determining whether the verification hyperlink is valid (block 440). For example, server system 120 may determine whether the verification hyperlink is valid based on the unique identifier included in the verification hyperlink and corresponding information stored by the database that specifies the relationship between the unique identifier and the user and/or the email. In one implementation, the corresponding information may include, for example, a quantity of times that the verification hyperlink was previously selected and/or a quantity of times that the verification process has been performed after the verification hyperlink was previously selected. Server system 120 may determine, based on the corresponding information, that the verification hyperlink is not valid when the verification hyperlink was previously selected more than a first quantity of times (e.g., one) and/or when the verification process has been performed, after the verification hyperlink was previously selected, more than a second quantity of times (e.g., one). In such cases, server system 120 may store indications of the number of prior selections of the verification hyperlink.

In another implementation, the corresponding information may include, for example, an expiration window associated with the verification hyperlink. The expiration window may specify a period of time (e.g., 24 hours) after which the verification hyperlink expires and/or a point in time (e.g., Jul. 22, 2035, at 10:00 PM EST) when the verification hyperlink expires. Server system 120 may determine, based on the corresponding information, that the verification hyperlink is not valid when the selection of the verification hyperlink occurs outside the expiration window.

If the verification hyperlink is not valid (block 440—NO), process 400 may include generating and transmitting a new email with a new verification hyperlink (block 445). For example, after determining that the verification hyperlink is not valid, server system 120 may generate a new email based on the same information (e.g., in the request) used to generate the previous email. Server system 120 may include the main hyperlink and a new verification hyperlink in the email. Server system 120 may transmit the new email to the email account of the user, as per the steps described above.

If the verification hyperlink is valid (block 440—YES), process 400 may include determining whether the computer terminal used by the user to make the selection of the verification hyperlink is registered (block 450). For example, the corresponding information may include a profile of the user. After determining that the verification hyperlink is valid, server system 120 may determine that computer terminal 110 is registered when the client device information, received from computer terminal 110, matches client device information in the profile of the user.

If the computer terminal is not registered (block 450—NO), process 400 may include generating and transmitting a failure message (block 455). For example, after determining that computer terminal 110 is not registered, server system 120 may generate a failure message that indicates that computer terminal 110 cannot be used to trigger the verification process (by selecting the verification hyperlink in the email). Server system 120 may transmit the failure message to computer terminal 110 in various forms—for example, as a subsequent email to the user, or as a web page set in response to the selection of the verification hyperlink. Computer terminal 110 may display the failure message to the user.

If computer terminal 110 is registered (block 450—YES), process 400 may include generating and causing a confirmation message to be generated according to the user's preselected verification options (block 460). For example, after determining that computer terminal 110 is registered, server system 120 may identify from the user's profile the verification option appropriate for use under the circumstances, and retrieve information about a user device (e.g., mobile device 120, telephony device 150, or network-specific device 170) specified, in the profile, to receive a confirmation message to verify the source of an email. The information about the user device may include a type of the user device, contact information (e.g., a phone number) associated with the user device, etc. Server system 120 may determine, based on the information about the user device and/or the profile, specifications for the confirmation message. The specifications for the confirmation message may include a type of the confirmation message and content for the confirmation message (e.g., based on verification options and/or content options selected by the user). In another implementation, the user may select the user device, select the type of the confirmation message, and/or provide the information about the user device after selecting the verification hyperlink (for example, as part of a web page transmitted to the user in response to the selection of the verification hyperlink).

Server system 120 may generate the confirmation message based on the information about the user device and/or the specifications for the confirmation message. The confirmation message may include a confirmation word and/or any other content previously selected by the user for the confirmation message. Server system 120 may, based on the addressing information, cause the confirmation message to be transmitted to the user device using facilities appropriate to the user device and message type. For example, server system 120 may employ an SMS gateway to transmit a confirmation message to a mobile device 140.

Process 400 may also include receiving an indication of selection of the main hyperlink (block 470) and providing the target webpage associated with the main hyperlink (block 480). For example, the user device may receive the confirmation message. The user may verify that the email is from the source based on the confirmation message (e.g., based on the confirmation word included in the confirmation message). Thereafter, the user may select the main hyperlink to access the target webpage. Server system 120 (or other resources associated with the source entity) may receive an indication of the selection of the main hyperlink and, in response, provide the target webpage.

In some implementations, the process described in FIG. 4 may be modified such that the user may also be given the option of initiating the verification process by sending a verification email in response to the email. For example, as part of block 420 the email sent to the user may include instructions to have the user reply to the email in order to initiate a verification of the source of the email. These instructions may be in addition (or an alternative) to the verification hyperlink described above. The user can then use their local email client to create and send a reply to the email to use as the verification request instead of the verification hyperlink. In some embodiments the reply email is addressed to the specified sender of the original email, such that common reply functionality included in most email clients may be used to generate the verification request. In other embodiments the original email may specify an email address to which verification replies should be sent, and the user sends the verification request email to that address. The original email may contain a unique identifier as part of the verification hyperlink or elsewhere within the original email, and the reply email may then also contain the unique identifier.

The verification request email is received at a mail server, determined to be a request for verification, and may be parsed for information such as the sender information (email address, IP address, etc.), the date/time of transmission, and/or unique identifiers that may be included in the original email and included in the reply (block 430). The verification process would then proceed similarly to that described above, with any validity determinations using the sender information, the date/time of transmission, and/or any unique identifiers from the verification request email.

Figure 5:
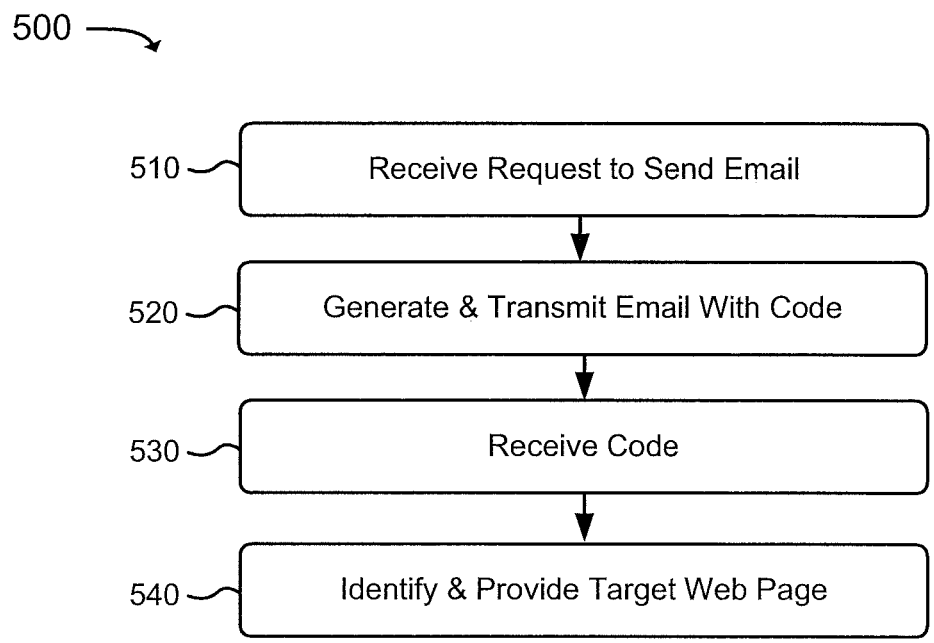
FIG. 5 is a flowchart of another example process for verifying a source of an email.

FIG. 5 is a flowchart of another example process 500 for verifying a source of an email. In one implementation, server system 120 may perform process 500. In another implementation, a device or collection of devices separate from, or in combination with, server system 120 may perform some or all of process 500.

As shown in FIG. 5, process 500 may include receiving a request to send an email (block 510). For example, as discussed above in reference to block 410 of FIG. 4, server system 120 may receive, from a device associated with a particular entity or from an operator of server system 120, a request to send an email to a user. The request may include a code, instructions for using the code to access a target webpage of a website associated with the particular entity, other information to include in the email, an email address of the user, and/or other information to be used for generating the email.

Process 500 may further include generating and transmitting the email with a code (block 520). For example, server system 120 may generate the email based on the information in the request. When generating the email, server system 120 may include the instructions and/or the code in the email. Server system 120 may transmit the email to an email account of the user.

Process 500 may also include receiving the code (block 530) and providing a target web page (block 540). For example, the user may use computer terminal 110 to access the email via the email account of the user. The user may use a web browser, based on the instructions included in the email, to navigate to (e.g., enter a URI of) a webpage of the particular entity. In one implementation, the user may enter the code, included in the email, in a particular location of the webpage. In another implementation, before entering the code, the user may enter user information (e.g., a username and a password) associated with the user. Server system 120 may authenticate the user based on the user information and navigate the user to a different webpage. The user may enter the code in a particular location of the different webpage. Server system 120 may receive the code entered by the user. Thereafter, server system 120 may identify the target webpage associated with the code and provide the target webpage. The user may view the target webpage via the web browser.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 3-5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    generating, by a server system, an email with a main hyperlink and a verification hyperlink,
        the verification hyperlink allowing a user to verify that the email is from an entity identified by the email;
    transmitting, by the server system, the email to an email account of the user;
    receiving, by the server system, an indication of a selection of the verification hyperlink;
    determining, by the server system, that the verification hyperlink is not valid;
    generating, by the server system and based on determining that the verification hyperlink is not valid, a new email with the main hyperlink and a new verification hyperlink;
    transmitting, by the server system, the new email to the email account of the user;
    receiving, by the server system, an indication of a selection of the new verification hyperlink; and
    transmitting, by the server system and based on the selection of the new verification hyperlink, a confirmation message to a device of the user,
        the confirmation message verifying, to the user, that the email is from the entity identified by the email.

2. The method of claim 1,
    where the device is one of a mobile telephone device, a landline telephone device, or a set-top box (STB), and
    where the confirmation message is one of a text message, a voice response unit (VRU) message, or data for the STB.

3. The method of claim 1, where the confirmation message comprises a confirmation word selected by the user.

4. The method of claim 1, where transmitting the confirmation message comprises:
    determining that the new verification hyperlink is valid after the selection of the new verification hyperlink; and
    transmitting the confirmation message based on determining that the new verification hyperlink is valid.

5. The method of claim 4, where determining that the new verification hyperlink is valid comprises:
    determining a quantity of times that the new verification hyperlink was previously selected;
    determining that the quantity of times does not satisfy a particular threshold; and
    determining that the new verification hyperlink is valid based on determining that the quantity of times does not satisfy the particular threshold.

6. The method of claim 1, where transmitting the confirmation message comprises:
    receiving device information associated with a computer device used for the selection of the new verification hyperlink,
        the computer device being one of the device or a different device;
    determining, based on the device information, that the computer device is registered to prompt the transmission of the confirmation message; and transmitting the confirmation message based on determining that the computer device is registered.

7. The method of claim 1, further comprising:
receiving a selection of at least one of the device to receive the confirmation message or a type of the confirmation message.

8. A system comprising:
a memory to store information associated with a recipient device of a user;
a processor to:
transmit an email to an email account of the user, the email including:
a first hyperlink to a target webpage of a website of a particular entity, and
a second hyperlink that, upon selection by the user, causes a verification to be performed to verify, to the user, that the email is from the particular entity,
receive an indication of a selection of the second hyperlink,
determine that the second hyperlink is not valid;
generate, based on determining that the second hyperlink is not valid, a new email with the first hyperlink and a new second hyperlink;
transmit the new email to the email account of the user;
receive an indication of a selection of the new second hyperlink; and
transmit, based on the selection of the new second hyperlink, a confirmation message to a recipient device.

9. The system of claim 8, where the processor is to:
generate the confirmation message based on one or more of:
a type of the recipient device, or
a telephone number associated with the recipient device.

10. The system of claim 9, where the telephone number comprises:
a mobile telephone number (MTN),
a billing telephone number (BTN), or
a working telephone number (WTN).

11. The system of claim 8, where the processor is further to:
transmit options for receiving the confirmation message, and
receive a selection of one of the options,
the selection of one of the options indicating a type of the confirmation message.

12. The system of claim 8,
where the processor is further to:
transmit options for content to include in the confirmation message, and
receive a selection of one of the options for the content,
where the the one of the options comprises at least one of a word, audio content, or video content, and
where the processor is further to:
include the content in the confirmation message.

13. The system of claim 8, where, after transmitting the confirmation message, the processor is further to:
receive an indication of a selection of the first hyperlink, and
provide, based on receiving the indication of the selection of the first hyperlink, the target webpage.

14. The system of claim 8, where, when transmitting the confirmation message, the processor is to:
receive device information associated with a computer device used for the selection of the new second hyperlink,
the computer device being one of the recipient device or a different device,
determine that the computer device is registered to prompt the transmission of the confirmation message, and
transmit the confirmation message based on determining that the computer device is registered.

15. The system of claim 8, where the processor is further to:
receive a request for the email,
the request including the first hyperlink and an email address associated with the email account, and generate the email based on the request.

16. A non-transitory computer-readable medium storing instructions, the instructions comprising:
one or more instructions that, when executed by at least one processor, cause the at least one processor to:
transmit an email to an email account of a user, the email including:
a first hyperlink to a target webpage of a website of a particular entity, and
a second hyperlink that, upon selection by the user, causes a verification to be performed to verify, to the user, that the email is from the particular entity;
receive an indication of a selection of the second hyperlink;
determine that the second hyperlink is not valid;
generate, based on determining that the second hyperlink is not valid, a new email with the first hyperlink and a new second hyperlink;
transmit the new email to the email account of the user;
receive an indication of a selection of the new second hyperlink; and
transmit, based on the selection of the new second hyperlink, a confirmation message to a device of the user,
the confirmation message verifying, to the user, that the email is from the particular entity.

17. The non-transitory computer-readable medium of claim 16, where the instructions further comprise:
one or more instructions that, when executed by the at least one processor, cause the at least one processor to:
receive, from a device associated with the particular entity, a request for the email; and
generate the email based on the request.

18. The non-transitory computer-readable medium of claim 17, where the request includes the first hyperlink and an email address associated with the email account.

19. The non-transitory computer-readable medium of claim 16, where the one or more instructions to transmit the confirmation message comprise:
one or more instructions that, when executed by the at least one processor, cause the at least one processor to:
determine that the new second hyperlink is valid based on a unique identifier included in the second hyperlink, and
transmit the confirmation message based on determining that the new second hyperlink is valid.

20. The non-transitory computer-readable medium of claim 16, where the one or more instructions to transmit the confirmation message comprise:
one or more instructions that, when executed by the at least one processor, cause the at least one processor to:
determine that the new second hyperlink is valid based on a quantity of times a verification process has been performed after the new second hyperlink was previously selected, and
transmit the confirmation message based on determining that the new second hyperlink is valid.

21. A method comprising:

generating, by one or more devices, an email with a verification hyperlink;

transmitting, by the one or more devices, the email to an email account of a user;

receiving, by the one or more devices, an indication of a selection of a verification hyperlink included in the email, the verification hyperlink allowing the user to verify that the email is from an entity identified by the email;

determining, by the one or more devices, that the verification hyperlink is not valid;

generating, by the one or more devices and based on determining that the verification hyperlink is not valid, a new email with a new verification hyperlink;

transmitting, by the one or more devices, the new email to the email account of the user;

receiving, by the one or more devices, an indication of a selection of the new verification hyperlink; and transmitting, by the one or more devices and based on the selection of the new verification hyperlink, a confirmation message to a device of the user.

22. The method of claim 21, where transmitting the confirmation message comprises:

determining that the device is registered, and transmitting the confirmation message based on the selection of the new verification hyperlink and based on determining that the device is registered.

23. The method of claim 21, where the confirmation message comprises a confirmation word selected by the user.

24. The method of claim 21, where the email further comprises a hyperlink to a target webpage of a website of the entity.

25. The method of claim 21, where generating the email comprises:

receiving a request for the email, the request including an email address associated with the email account of the user, and generating the email based on the request.

* * * * *